United States Patent
Asakura et al.

Patent Number: 5,999,314
Date of Patent: Dec. 7, 1999

[54] OPTICAL DISPLAY SYSTEM HAVING A BREWSTER'S ANGLE REGULATING FILM

[75] Inventors: Motoh Asakura; Kazuya Kobayashi; Shinji Nishikawa, all of Mie, Japan

[73] Assignee: Central Glass Company Limited, United Kingdom

[21] Appl. No.: 08/974,150

[22] Filed: Nov. 19, 1997

[30] Foreign Application Priority Data

Nov. 20, 1996 [JP] Japan ..................................... 8-309779

[51] Int. Cl.⁶ .............................. G02B 5/30; G02B 27/14
[52] U.S. Cl. ................................ 359/487; 359/630; 345/7
[58] Field of Search .................. 345/7; 359/13, 359/630, 487

[56] References Cited

U.S. PATENT DOCUMENTS

| | | | |
|---|---|---|---|
| 4,973,132 | 11/1990 | McDonald et al. | 359/13 |
| 4,973,139 | 11/1990 | Weinrauch et al. | 359/630 |
| 5,053,755 | 10/1991 | Smith et al. | 359/630 |
| 5,212,471 | 5/1993 | McDonald | 359/13 |
| 5,510,913 | 4/1996 | Hashimoto et al. | 359/487 |

FOREIGN PATENT DOCUMENTS

| | | | |
|---|---|---|---|
| 0 580 143 A2 | 7/1993 | European Pat. Off. | G02B 27/00 |
| 61-045218 | 3/1986 | Japan | G02B 27/02 |
| 02141720 | 5/1990 | Japan | G02B 27/02 |
| 02294615 | 5/1990 | Japan | G02B 27/02 |
| 2-141720 | 5/1990 | Japan | G02B 27/02 |
| 2-294615 | 5/1990 | Japan | G02B 27/02 |
| 6-40271 | 6/1994 | Japan | B60K 35/00 |
| 406273691 | 9/1994 | Japan | 359/13 |

*Primary Examiner*—Cassandra Spyrou
*Assistant Examiner*—John Juba, Jr.
*Attorney, Agent, or Firm*—Evenson, McKeown, Edwards & Lenahan, P.L.L.C.

[57] ABSTRACT

A head-up display system of an automotive vehicle, comprising outboard-side and inboard-side glass plates constituting a front windshield glass. An intermediate film is disposed between the outboard-side and inboard-side glass plates to bond the glass plates. A polarization-direction changing layer is secured to the inboard surface of the outboard-side glass plate. A Brewster's angle regulating film is secured to the inboard surface of the inboard-side glass plate. The Brewster's angle regulating film has a refractive index different from that of the glass plates. A displaying device is provided to generate a display light of information. Additionally, a light-polarizing device is provided to polarize the display light into S-wave. The display light having S-wave is incident at about Brewster's angle of the Brewster's angle regulating film to the front windshield glass so as to pass through the polarization-direction changing layer and to be reflected at the outboard surface of the outboard-side glass plate toward the side of the displaying device.

16 Claims, 3 Drawing Sheets

OPTICAL DISPLAY SYSTEM HAVING A BREWSTER'S ANGLE REGULATING FILM

BACKGROUND OF THE INVENTION

1. Field of the Invention

This invention relates to improvements in a display system for optically projecting a display light of information to be observed by a person, and more particularly to the display system such as a head-up display system which is configured, for example, such that a driver of an automotive vehicle can observe an image of driving information projected as the display light on a windshield glass while looking a frontal view through the windshield glass in such a manner that the driving information is superimposed on the frontal view.

2. Description of the Prior Art

A variety of head-up display systems of an automotive vehicle have been hitherto proposed and put into practical use. A typical head-up display system is constituted by directly applying a film functioning as a half mirror on a windshield glass, or by interposing the half mirror between two glass plates. However, with this head-up display system, reflection of light of an image is unavoidably made on the front-side or rear-side surface of the glass plate thereby forming a double image which is difficult to be observed by a driver. In view of this, another types of the head-up display system have been proposed, in which light of the image is reflected from the surface of the glass plate without using the half mirror in order to avoid formation of the double image. One of these is configured by applying a so-called λ/2 film (for changing a direction of polarization of light) on a transparent plate such as a glass plate, as disclosed in Japanese Patent Provisional Publication No. 2-141720. Another one is configured by bonding a transparent film having birefringence on a transparent plate, as disclosed in Japanese Patent Provisional Publication No. 2-294615. A further one is configured by bonding a polarization-direction changing layer formed of a crystalline high polymer on a transparent plate, as disclosed in Japanese Patent Provisional Publication No. 6-40271. Additionally, some of the inventors of this application have proposed a display system including a combination of a polarization-direction changing film, a light-transmittable reflection film and an antireflection film, as disclosed in a U.S. patent application Ser. No. 08/621379 entitled "Glass Arrangement".

However, the display systems as disclosed in the above publications and application require to cause the light of image to be incident on the transparent plate at Brewster's angle of the transparent plate. Accordingly, the angle of incidence of light is fixed at 56.6° in case that the transparent plate is a glass plate. As a result, location of a displaying device for generating the light of image is limited within a certain region. This is considerably problematic particularly in case that the display system forms part of an automotive vehicle which does not have a sufficient space within the above-mentioned certain region. In view of this, an additional optical device such as a mirror may be required as disclosed in Japanese Patent Provisional Publication No. 2-141720, complicating the display system in construction and in assembly process.

BRIEF SUMMARY OF THE INVENTION

It is an object of the present invention to provide an improved display system which is simple in construction and assembly process and can effectively overcome drawbacks encountered in conventional display systems such as a head-up display system.

Another object of the present invention is to provide an improved display system which allows a light of image (display light) to be incident onto a transparent plate (glass plate) at an angle different from Brewster's angle (56.6°) of the transparent plate (glass plate), thereby increasing freedom of location for a displaying device while preventing formation of double image of the light of image.

A further object of the present invention is to provide an improved display system in which the angle of incidence of light of image (display light) to a transparent plate can be regulated or changed under the action of a Brewster's angle regulating film secured to a surface of the transparent plate.

An aspect of the present invention resides in a display system comprising at least one transparent plate. A Brewster's angle regulating film is secured to a surface of the transparent plate, the Brewster's angle regulating film having a refractive index different from that of the transparent plate. A displaying device is provided to generate a display light of information. A light-polarizing device is provided to polarize the display light. The polarized display light is incident at an angle around about Brewster's angle of the Brewster's angle regulating film to the transparent plate and reflected toward a side of the displaying device.

Another aspect of the present invention resides in a display system comprising at least one transparent plate. A polarization-direction changing layer is secured to a first surface of the transparent plate. A Brewster's angle regulating film is secured to a second surface of the transparent plate. The Brewster's angle regulating film has a refractive index different from that of the transparent plate. A displaying device is provided to generate a display light of information. Additionally, a light-polarizing device is provided to polarize the display light into P-wave (whose vibration-direction is parallel with the plane of incidence of the light). The display light having P-wave is incident at an angle around Brewster's angle of the Brewster's angle regulating film to the transparent plate to pass through the polarization-direction changing layer and to be reflected toward a side of the displaying device.

A further aspect of the present invention resides in a display system comprising at least one transparent plate. A polarization-direction changing layer is secured to a first surface of the transparent plate. A Brewster's angle regulating film is secured to a second surface of the transparent plate, the Brewster's angle regulating film having a refractive index different from that of the transparent plate. A displaying device is provided to generate a display light of information. Additionally, a light-polarizing device is provided to polarize the display light into S-wave (whose vibration-direction is perpendicular to that of P-wave and to the plane of incidence of the light). The display light having S-wave is incident at an angle around Brewster's angle of the Brewster's angle regulating film to the transparent plate to pass through the polarization-direction changing layer and to be reflected toward a side of the displaying device.

A still further object of the present invention resides in a display system comprising at least one transparent plate. A Brewster's angle regulating film is formed at a first surface of the transparent plate. The Brewster's angle regulating film has a refractive index different from that of the transparent plate. A displaying device is provided to generate a display light of information. A light-polarizing device is provided to polarize the display light into P-wave. The display light having P-wave is incident at an angle around Brewster's angle of the Brewster's angle regulating film to the transparent plate to be reflected toward a side of the displaying device.

With the above aspects, the angle of incidence of the display light can be changed regardless of conventional Brewster's angle of glass plate by virtue of the refractive index of a Brewster's angle regulating film, thereby increasing the freedom of location for the displaying device while effectively preventing formation of double image of the display light. Additionally, no mirror is necessary for the display system, and therefore the display system is simple in construction and facilitated in assembly process.

BRIEF DESCRIPTION OF THE DRAWINGS

In the drawings, like reference numerals designate like parts and elements throughout all figures, in which.

DETAILED DESCRIPTION OF THE INVENTION

Figure 1:
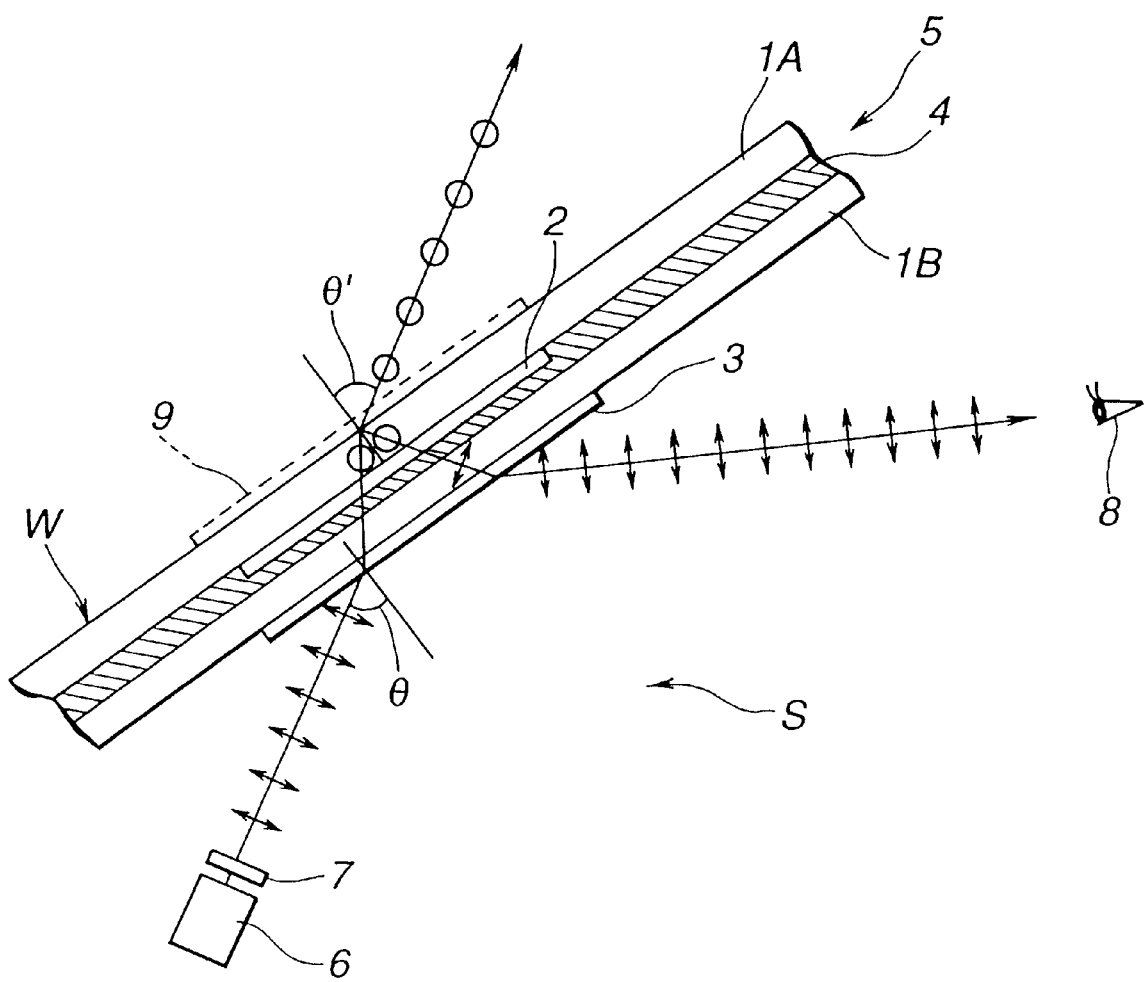
FIG. 1 is a fragmentary schematic sectional view of a first embodiment of a display system according to the present invention.

Referring now to FIG. 1 of the drawings, a first embodiment of a display system according to the present invention is illustrated by the reference character S. The display system S of this embodiment is a head-up display system and constituted by incorporating a polarization-direction changing film or layer 2. The polarization-direction changing layer 2 is adapted to change the direction of polarization of light to be incident thereon, i.e., to rotate a plane of polarization of light to be incident thereon. The polarization-direction changing layer 2 in this embodiment is formed of a liquid crystal high polymer which is in twisted nematic orientation under a liquid crystal condition and is in a glassy state at a temperature lower than liquid crystal transition point thereof.

The polarization-direction changing layer 2 is formed as follows: The liquid crystal high polymer is coated on a transparent substrate (substrate film) such as a plastic film formed of, for example, polyethylene terephthalate (PET). Then a shearing force is applied to the liquid crystal high polymer, and thereafter the liquid crystal high polymer is subjected to heat-treatment and then cooling so that a liquid crystal orientation is fixed. Thus, the polarization-direction changing layer 2 is formed on the surface of the substrate film. Examples of such a liquid crystal high polymer are a main-chain type polymer such as optically active polyester, polyamide, polycarbonate, and polyesterimide, and a side-chain type polymer such as optically active polyacrylate, polymethacrylate, and polymalonate.

The polarization-direction changing layer 2 having a thickness of 5 $\mu$m is formed on the substrate film made of polyethylene terephthalate or the like, in the manner mentioned above. The thus formed polarization-direction changing layer 2 bonded to the inboard surface of an outboard-side glass plate (transparent plate) 1A forming part of the front windshield glass W, with a tape-like adhesive (not shown), after the substrate film is removed.

A Brewster's angle regulating film or layer 3 is formed at the inboard surface of an inboard-side glass plate (transparent plate) 1B forming part of the front windshield glass W, under usual sputtering. The Brewster's angle regulating film 3 is formed of $TiO_2$.

Thereafter, the inboard-side glass plate 1B is temporarily bonded at its outboard surface to the inboard surface of the outboard-side glass plate 1A with an intermediate film or layer 4 (made of polyvinyl butyral or the like), so that the polarization-direction changing layer 2 is located between the outboard-side glass plate 1A and the inboard-side glass plate 1B in such a manner that the polarization-direction changing layer 2 is separate from the outboard-side surface of the inboard-side glass plate 1B, as clearly shown in FIG. 1. The inboard-side glass plate 1B defines therein side a passenger compartment in which a driver and/or a vehicle passenger reside. It will be understood that a layer of the intermediate film 4 lies between the polarization-direction changing layer 2 and the inboard-side glass plate 1B. Such a temporarily bonded structure is then subjected to a usual autoclave treatment, thereby obtaining a laminated glass 5 used for the automotive vehicle front windshield glass W.

The above-discussed laminated glass 5 is used as the automotive vehicle windshield glass W and forms part of the headup display system S. The head-up display system S includes a displaying device 6 such as a C.R.T., a fluorescent display tube, a liquid crystal display or the like. The displaying device 6 generates a display light such as driving information or the like. The display light includes S-wave and P-wave and is incident to a light-polarizing device 7 for polarizing the light into P-wave, so that the display light from the displaying device 6 is polarized to transmit the P-wave. The displaying device 6 and the light-polarizing device 7 are arranged such that the display light of the P-wave is incident on the laminated glass 5 at Brewster's angle ($\theta$=63°) of the Brewster's angle regulating film 3. It will be understood that, in case of using the liquid crystal display as the displaying device 6, the light-polarizing plate of the liquid crystal display may be set to be directed to generate P-wave, in which the displaying device 7 also serves as the light-polarizing device so that the light-polarizing device is unnecessary to be separately used.

This P-wave is incident on the inboard-side glass plate 1B, in which no reflection is made at the inboard surface (the interface between air and the glass plate) of the glass plate 1B because the P-wave is incident at Brewster's angle of the regulating film 3 to the inboard-side glass plate 1B. As a result, the whole amount of light from the light-polarizing device 7 enters the laminated glass 5. The thus entering light reaches the polarization-direction changing layer 2, in which the P-wave is rotated into S-wave. This S-wave then reaches the inboard surface of the outboard-side plate glass 1A. Here, a part of the S-wave outgoes through this surface, while about 20% of the S-wave is reflected at this surface in accordance with the reflectivity (20.7%) of the outboard-side plate glass 1A and again enters the polarization-direction changing layer 2 to be rotated into P-wave. This P-wave outgoes through the Brewster's regulating film 3 and reaches to the eyes 8 of the driver and the like, in which the outgoing angle of the light (P-wave) is Brewster's angle ($\theta'$=63°) of the Brewster's angle regulating film 3 and therefore the whole amount of the light can be observed by eyes 8 of the driver or the like causing no reflection of the light at the interface between the air and the Brewster's angle regulating film 3.

Additionally, the intermediate layer 4 between the outboard-side and inboard-side glass plates 1A, 1B has an refractive index of 1.52, and the polarization-direction changing layer 2 has generally the same refractive index as that of the intermediate layer 4. Accordingly, reflection of light is negligible at the interface between the intermediate layer 4 and the polarization-direction changing layer 2.

Although refraction and reflection of light are caused at the interface between the Brewster's angle regulating film 3 and the inboard-side glass plate 1B owing to the difference in refractive index therebetween, the reflectivity at this interface is about 0.75% in this embodiment and therefore reflection of light at this interface is negligible. As a result, double image cannot be formed and therefore a clear image of the driving information or the like can be observed by the driver.

It will be appreciated that, in this embodiment, a light-transmittable reflection layer or film 9 may be formed at the outboard surface of the outboard-side glass plate 1A as indicated in phantom in FIG. 1 in order to further raise the reflectivity of the outboard surface of the outboard-side glass plate 1A, in which the light-transmittable reflection film is a thin film formed of Al, Au, Ag or Cu.

Figure 2:
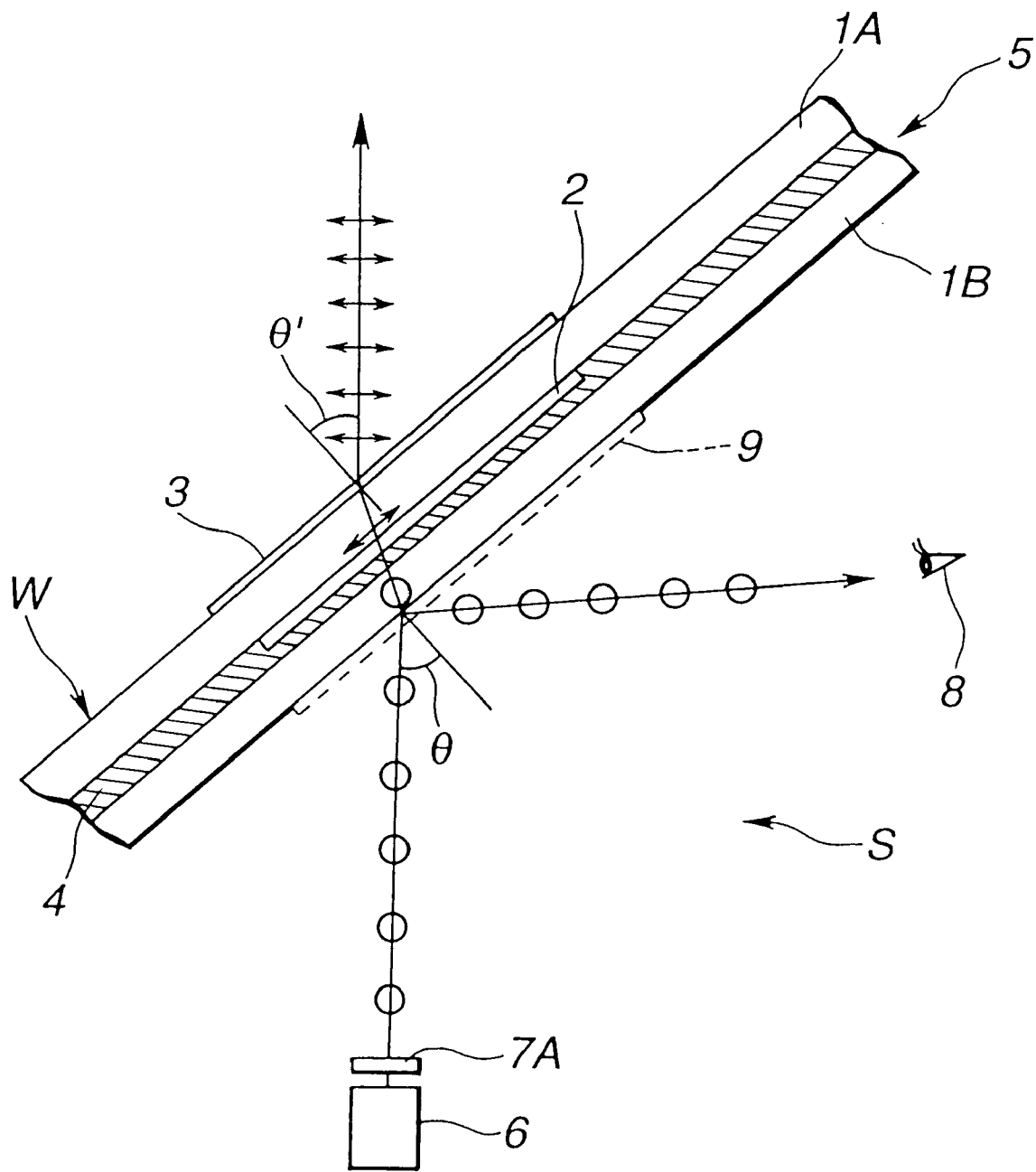
FIG. 2 is a fragmentary schematic sectional view of a second embodiment of the display system according to the present invention.

FIG. 2 illustrates a second embodiment of the display system S according to the present invention, which is similar to the first embodiment display system S with the exception that S-wave is used as the display light such as the driving information or the like. In this embodiment, the Brewster's angle regulating film 3 is formed at the outboard surface of the outboard-side glass plate 1A and is not formed at the inboard surface of the inboard-side glass plate 1B. The Brewster's angle regulating film 3 is formed of $MgF_2$ and has a reflectivity of 1.38 and Brewster's angle of 54°. Formation of the Brewster's angle regulating film 3 of this embodiment is accomplished by usual methods such as vacuum deposition. The laminated glass 5 of this embodiment is produced in the similar manner to that in the first embodiment and therefore has the similar arrangement to that in the first embodiment.

The above-discussed laminated glass 5 is used as the automotive vehicle windshield glass W and forms part of the head-up display system S. The head-up display system S includes the displaying device 6 such as a C.R.T., a fluorescent display tube, a liquid crystal display or the like. The displaying device 6 generates a display light such as driving information or the like.

The display light includes S-wave and P-wave and is incident to a light-polarizing device 7A for polarizing light into S-wave, so that the display light from the displaying device 6 is polarized to transmit the P-wave. The displaying device 6 and the light-polarizing device 7A are arranged such that the display light is incident at Brewster's angle ($\theta=54°$) of the Brewster's angle regulating film 3 on the laminated glass 5. It will be understood that, in case of using the liquid crystal display as the displaying device 6, the light-polarizing plate of the liquid crystal display may be set to be directed to generate S-wave, in which the displaying device serves also as the light-polarizing device so that the light-polarizing device is unnecessary to be separately used.

This S-wave is incident on the inboard-side glass plate 1B and reflected at the inboard surface (or the interface between the glass plate and air) of the inboard-side glass plate 1B in accordance with the reflectivity of the glass plate 1B. The reflected S-wave reaches the eyes 8 of the driver or the like so that the driver or the like can observe the display light such as the driving information or the like.

A part of the S-wave which has not been reflected by the inboard surface of the laminated glass 5 enters the laminated glass 5 and rotated into P-wave under the action of the polarization-direction changing layer 2. This P-wave reaches the Brewster's angle regulating film 3 through the outboard surface of the outboard-side glass plate 1A. At this time, the P-wave outgoes through the outboard side of the outboard-side glass plate 1A at the Brewster's angle ($\theta'=54°$) of the regulating film 3, so that no reflection of light occurs at the interface between the outboard surface of the outboard-side glass plate 1A and the Brewster's angle regulating film 3.

It will be appreciated that, in this embodiment, the light-transmittable reflection layer or film 9 may be formed at the inboard surface of the inboard-side glass plate 1B as indicated in phantom in FIG. 2 in order to further raise the reflectivity at the inboard surface of the inboard-side glass plate 1B.

Figure 3:
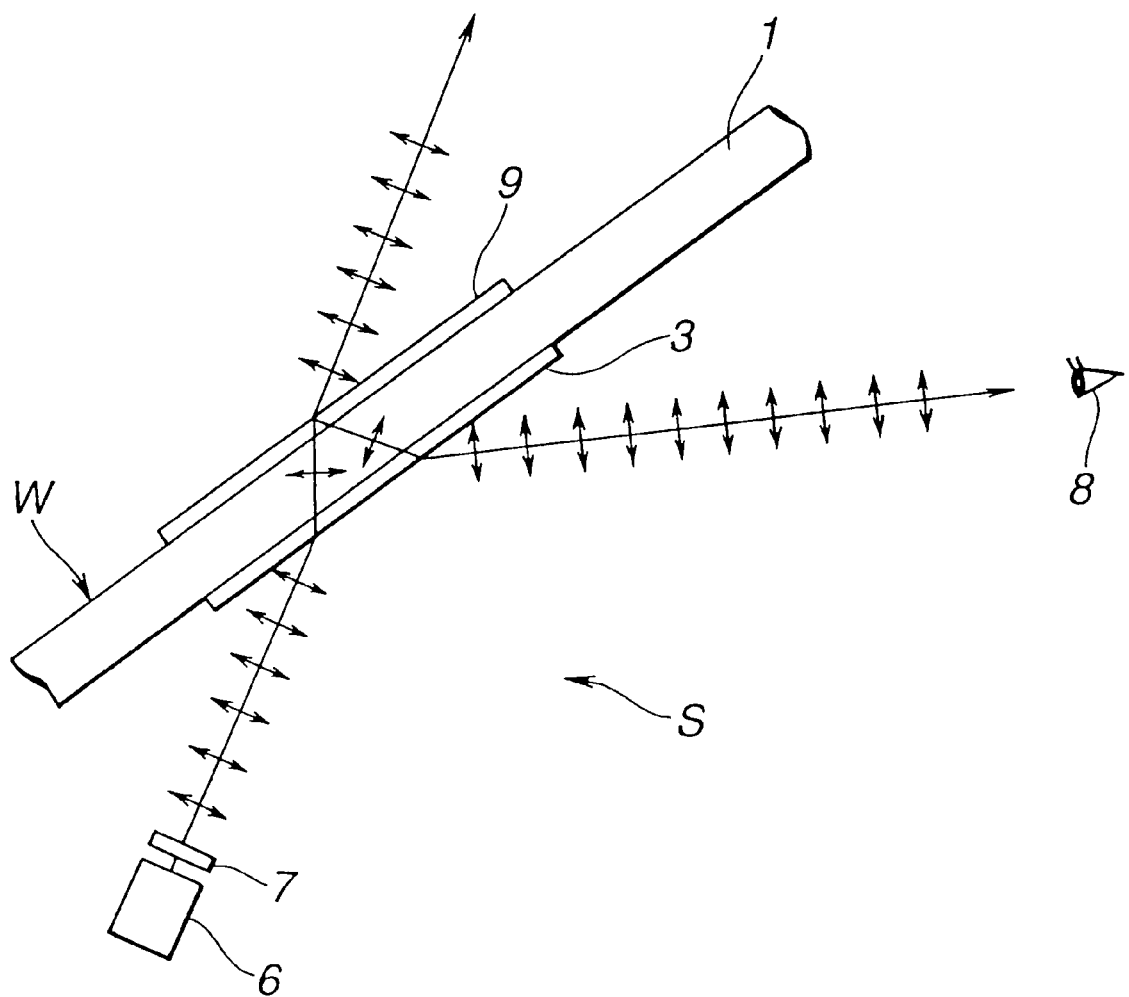
FIG. 3 is a fragmentary schematic sectional view of a third embodiment of the display system according to the present invention.

FIG. 3 illustrates a third embodiment of the display system S according to the present invention, which is similar to the first embodiment display system S. In this embodiment, a single glass plate (transparent plate) 1 is the front windshield glass W and therefore its inboard surface defines therein side a passenger compartment in which a driver and/or a vehicle passenger reside. The display system S of this embodiment is the head-up display system including the front windshield glass W.

In this embodiment, the Brewster's angle regulating film (the thin film of a metal) 3 is formed at the inboard surface of the single glass plate 1. Additionally, the light-transmittable reflection film 9 is formed at the outboard surface of the single glass plate 1. No polarization-direction changing layer is used in this embodiment.

The above-discussed single glass plate 1 with the Brewster's angle regulating film 3 and the light-transmittable reflection layer 9 is used as the automotive vehicle windshield glass W and forms part of the head-up display system S. The head-up display system S includes the displaying device 6 and the light-polarizing device 7 for polarizing light into P-wave. The displaying device 6 and the light-polarizing device 7 are arranged such that the display light of the S-wave is incident on the laminated glass 1 at Brewster's angle of the Brewster's angle regulating film 3. The displaying device 6 generates the display light such as driving information or the like. The display light includes S-wave and P-wave and is incident to the light-polarizing device 7 for polarizing light into P-wave, so that the display light from the displaying device 6 is polarized to transmit the P-wave.

This P-wave first reaches the Brewster's angle regulating film 3 formed at the inboard surface of the single glass plate 1, in which no reflection of the light occurs because the P-wave is incident at Brewster's angle of the regulating film 3 to the single glass plate 1. As a result, the whole amount of light from the light-polarizing device 7 enters the single glass plate 1. The thus entering light reaches the outboard surface of the single glass plate 1. At this time, a part of the light outgoes through the outboard surface of the single plate 1, while a part of the light is reflected by the light-transmittable reflection film 9 in accordance with the reflectivity of the light-transmittable reflection film 9 and outgoes toward the eyes 8 of the driver or the like. Here, since the outgoing of the light is made at the Brewster's angle of the Brewster's angle regulating film 3, no reflection is made at the inboard surface of the single glass plate 1 so that the whole amount of the display light or driving information can be clearly observed by eyes 8 of the driver or the like.

While the display system S of the embodiments has been shown and described as including one or two (inorganic) glass plates, it will be understood that the glass plates may be replaced with a single transparent plate or two transparent plates, in which each transparent plate is made of a transparent organic glass plate such as a transparent plastic plate.

Otherwise, the two transparent plates may be an inorganic glass plate and an organic glass plate, respectively.

The display system S of the embodiments has been shown and described as the head-up display system including an automotive vehicle front windshield glass, it will be understood that the display system S may include other window glasses of the automotive vehicle so as to form a combiner, or includes a single glass plate (separate from the windshield glass or window glass) so as to form a separate combiner. Additionally, the display system S may includes architectural glass or a partition wall glass so as to display a variety of information.

In case that the display system S includes a vehicular (for example, automotive vehicle) windshield glass (laminated glass), it is preferable to bond the polarization-direction changing layer 2 onto the inboard surface of the outboard-side glass plate 1A from the view point of improving so-called impact and penetration resistance of the windshield glass. The impact resistance is improved because a part (in contact with the polarization-direction changing layer 2) of the outboard-side glass cannot drop into the passenger compartment even when the windshield glass is broken, though the part is low in bonding strength as compared with the other parts in contact with the intermediate film 4 made of polyvinyl butyral. Additionally, it is preferable to bond the polarization-direction changing layer 2 onto the outboard surface of the inboard-side glass plate 1B from the view point of improving durability of the polarization-direction changing layer 2 because sun light reaches the polarization-direction changing layer through the intermediate film (polyvinyl butyral) so that ultraviolet ray can be absorbed by the intermediate film to some extent.

The polarization-direction changing layer 2 has been shown and described as being formed of the liquid crystal high polymer which is in twisted nematic orientation under liquid crystal condition and is in glassy state at a temperature lower than a liquid crystal transition point thereof. This is preferable from the view point of preventing double image from being formed throughout a whole visible region. However, it will be appreciated that the above-type of the polarization-direction changing layer may be replaced with other types of polarization-direction changing films such as a transparent film having a birefringence, and a so-called λ/2 film or layer.

While the Brewster's angle regulating film 3 has been shown and described as being formed of $TiO_2$ having a refractive index of 2.0 or $MgF_2$ having a refractive index of 1.38, it will be appreciated that the Brewster's angle regulating film 3 may be formed of a variety of transparent materials having a refractive index different from that of the transparent plates such as glass plates, the transparent materials including $CaF_2$ having a refractive index of 1.43, $SiO_2$ having a refractive index of 1.46, $NaAlO_3$ having a refractive index of 1.35 to 1.39, $CeO_2$ having a refractive index of 2.1 to 2.2, and $In_2O_3$ having a refractive index of 2.0, ZnS having a refractive index of 2.2 to 2.35, $ZrO_2$ having a refractive index of 2.1, and the like.

The displaying device 6 and the light-polarizing device 7 of the display system S are arranged such that the display light (or the driving information) is incident on the transparent plate at Brewster's angle of the Brewster's angle regulating film 3. A C.R.T., a fluorescent display tube, a liquid crystal display or the like is used as the displaying device 6. In case of using the liquid crystal display as the displaying device 6, the light-polarizing plate of the liquid crystal display may be set to be directed to accomplish so-called S-polarization to generate S-wave or so-called P-polarization to generate P-wave, in which the displaying device serves also as the light-polarizing device so that the light-polarizing device is unnecessary to be separately used.

In case that P-wave is used as the display light (or the driving information), the P-wave is incident onto the transparent plate at an angle around Brewster's angle of the Brewster's angle regulating film. As a result, no or negligible reflection is made at the surface of this Brewster's angle regulating film, so that the display light is reflected at the backside surface of the transparent plate (or by the light-transmittable reflection film if used) thereby preventing formation of double image of the display light. In case that S-wave is used as the display light (or the driving information), the S-wave is incident onto the surface of the transparent plate at an angle around Brewster's angle of the Brewster's angle regulating film and reflected at the surface of the transparent plate (or by the light-transmittable reflection film if this film is used) to the side of the displaying device, in which the light entering the transparent plate outgoes through the Brewster's angle regulating film formed at the backside surface of the transparent plate, at Brewster's angle of the Brewster's angle regulating film. As a result, no or negligible reflection is made at the surface of the Brewster's angle regulating film, thereby preventing formation of double image of the display light.

As appreciated from the above, according to the present invention, the transparent plate of the display system is provided with the Brewster's angle regulating film which is different in refractive index from the transparent plate, in which the Brewster's angle of the Brewster's angle regulating film is represented by θ obtained according to n=tan θ on the assumption that the refractive index of the regulating film is n. The Brewster's angle θ is 63° in case that the Brewster's angle regulating film is formed of $TiO_2$, whereas the angle θ is 54° in case that the Brewster's angle regulating film is formed of $MgF_2$. In this regard, in conventional similar display systems, it is necessary that display light is incident on a transparent plate (glass plate) at the Brewster's angle (56.6°) of the transparent plate (glass plate).

What is claimed is:

1. A display system comprising:
    a displaying device for generating a display light of information;
    a light-polarizing device for polarizing the display light;
    at least one transparent plate having a refractive index and a corresponding Brewster's angle when interfaced with air;
    a Brewster's angle regulating film secured to a surface of said transparent plate, said Brewster's angle regulating film having a refractive index different from that of said transparent plate and having a Brewster's angle in air, said Brewster's angle regulating film being itself transparent whereby substantially all display light incident thereon passes through said Brewster's angle regulating film, preventing said display light from being reflected by said Brewster's angle regulating film;
    wherein the polarized display light is incident on said Brewster's angle regulating film at an angle around Brewster's angle of said Brewster's angle regulating film, travels through said Brewster's angle regulating film to said transparent plate and is reflected toward a side of said displaying device;
    wherein said displaying device is locatable to provide display light to said transparent plate at an angle exceeding Brewster's angle of said transparent plate corresponding to an interface with air.

2. A display system as claimed in claim 1, wherein said Brewster's angle regulating film is formed of a material selected from the group consisting of $TiO_2$, $MgF_2$, $CaF_2$, $SiO_2$, $NaAlO_3$, $CeO_2$, $In_2O_3$, and ZnS.

3. A display system as claimed in claim 1, further comprising a polarization-direction changing layer adapted to change a direction of polarization of said display light, said polarization-direction changing layer being formed of a liquid crystal high polymer which is in twisted nematic orientation under a liquid crystal condition and is in a glassy state at a temperature lower than liquid crystal transition point thereof.

4. A display system according to claim 3 wherein said Brewster's angle regulating film is formed of a material selected from the group consisting of $TiO_2$, $MgF_2$, $CaF_2$, $SiO_2$, $NaAlO_3$, $CeO_2$, $In_2O_3$, and ZnS.

5. A display system comprising:
a displaying device for generating a display light of information;
a light-polarizing device for polarizing the display light into P-wave;
at least one transparent plate having a refractive index and a corresponding Brewster's angle when interfaced with air;
a polarization-direction changing layer secured to a first surface of said transparent plate;
a Brewster's angle regulating film secured to a second surface of said transparent plate, said Brewster's angle regulating film having a refractive index different from that of said transparent plate and having a Brewster's angle in air, said Brewster's angle regulating film being itself transparent, whereby substantially all display light incident thereon passes through said Brewster's angle regulating film, preventing said light from being reflected by said Brewster's angle regulating film;
wherein the display light having P-wave is incident on said Brewster's angle regulating film at an angle around Brewster's angle of said Brewster's angle regulating film and travels through said Brewster's angle regulating film to said transparent plate to pass through said polarization-direction changing layer and to be reflected toward a side of said displaying device;
wherein said displaying device is locatable to provide display light to said transparent plate at an angle exceeding Brewster's angle of said transparent plate corresponding to an interface with air.

6. A display system as claimed in claim 5, further comprising a light-transmittable reflection film secured to the first surface of said transparent plate, the display light having S-wave being reflected by said light-transmittable reflection film to be directed toward the side of said displaying device.

7. A display system as claimed in claim 5, wherein said at least one transparent plate includes first and second transparent plates, said first transparent plate being located outside relative to said second transparent plate defining a space in which a person resides,
wherein said display system further comprises an intermediate film disposed between said first and second transparent plates to bond said first and second transparent plates, and
wherein said polarization-direction changing layer is bonded to said first transparent plate and separate from said second transparent plate so that a layer of said intermediate film lies between said first polarization-direction changing layer and said second transparent plate.

8. A display system according to claim 5, wherein said Brewster's angle regulating film is formed of a material selected from the group consisting of $TiO_2$, $MgF_2$, $CaF_2$, $SiO_2$, $NaAlO_3$, $CeO_2$, $In_2O_3$, and ZnS.

9. A display system comprising:
a displaying device for generating a display light of information;
a light-polarizing device for polarizing the display light into S-wave;
at least one transparent plate having a refractive index and a corresponding Brewster's angle when interfaced with air;
a polarization-direction changing layer secured to a first surface of said transparent plate;
a Brewster's angle regulating film secured to a second surface of said transparent plate, said Brewster's angle regulating film having a refractive index different from that of said transparent plate and having a Brewster's angle in air, said Brewster's angle regulating film being itself transparent, whereby substantially all display light incident thereon passes through said Brewster's angle regulating film, preventing said light from being reflected by said Brewster's angle regulating film;
wherein the display light having S-wave is incident on said Brewster's angle separating film at an angle around Brewster's angle of said Brewster's angle regulating film and travels through said Brewster's angle regulating film to said transparent plate to pass through said polarization-direction changing layer and to be reflected toward a side of said displaying device;
wherein said displaying device is locatable to provide display light to said transparent plate at an angle exceeding Brewster's angle of said transparent plate corresponding to an interface with air.

10. A display system as claimed in claim 9, further comprising a light-transmittable reflection film secured to the first surface of said transparent plate, the display light having P-wave being reflected by said light-transmittable reflection film to be directed toward the side of said displaying device.

11. A display system as claimed in claim 9, wherein said at least one transparent plate includes first and second transparent plates, said first transparent plate being located outside relative to said second transparent plate defining a space in which a person resides,
wherein said display system further comprises an intermediate film disposed between said first and second transparent plates to bond said first and second transparent plates, and
wherein said polarization-direction changing layer is bonded to said first transparent plate and separate from said second transparent plate so that a layer of said intermediate film lies between said first polarization-direction changing layer and said second transparent plate.

12. A display system according to claim 9, wherein said Brewster's angle regulating film is formed of a material selected from the group consisting of $TiO_2$, $MgF_2$, $CaF_2$, $SiO_2$, $NaAlO_3$, $CeO_2$, $In_2O_3$, and ZnS.

13. A display system comprising:
a displaying device for generating a display light of information;
a light-polarization device for polarizing the display light into P-wave;
at least one transparent plate having a refractive index and a corresponding Brewster's angle when interfaced with air;

a Brewster's angle regulating film formed at a first surface of said transparent plate, said Brewster's angle regulating film having a refractive index different from that of said transparent plate and having a Brewster's angle in air, said Brewster's angle regulating film being itself transparent, whereby substantially all display light incident thereon passes through said Brewster's angle regulating film, preventing said light from being reflected by said Brewster's angle regulating film;

a polarization-direction changing layer secured to a first surface of said transparent plate;

wherein the display light having P-wave is incident on said Brewster's angle regulating film at an angle around Brewster's angle of said Brewster's angle regulating film and travels through said Brewster's angle regulating film to said transparent plate to pass through said polarization-direction changing layer, and to be reflected toward a side of said displaying device;

wherein said displaying device is locatable to provide display light to said transparent plate at an angle exceeding Brewster's angle of said transparent plate corresponding to an interface with air.

14. A display system as claimed in claim 13, wherein said at least one transparent plate is a single transparent plate having the first surface defining a space where a person resides.

15. A display system as claimed in claim 14, further comprising a light-transmittable reflection film secured to a second surface of said transparent plate which second surface is opposite to the first surface, the display light having P-wave being reflected by said light-transmittable reflection film to be directed toward the side of said displaying device.

16. A display system according to claim 13, wherein said Brewster's angle regulating film is formed of a material selected from the group consisting of $TiO_2$, $MgF_2$, $CaF_2$, $SiO_2$, $NaAlO_3$, $CeO_2$, $In_2O_3$, and ZnS.

* * * * *